T. HOOCK.
ELECTRICALLY HEATED APPARATUS.
APPLICATION FILED OCT. 23, 1912.
1,146,164.
Patented July 13, 1915.
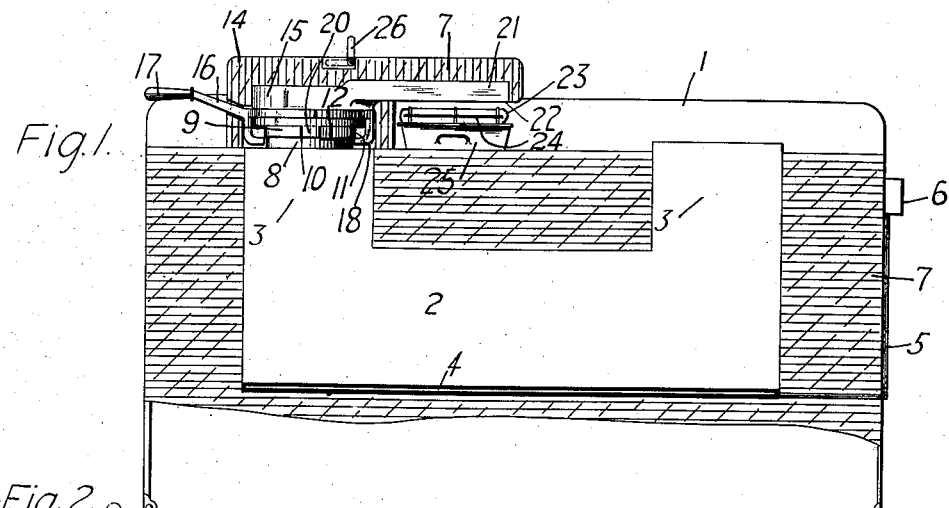
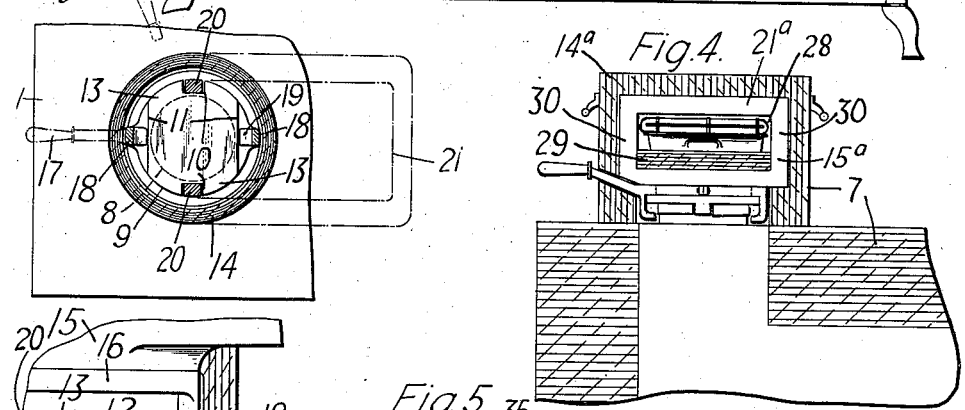
WITNESSES:
INVENTOR
Theodore Hoock
BY
ATTORNEY

UNITED STATES PATENT OFFICE.

THEODORE HOOCK, OF COLOGNE, BAYENTHAL, GERMANY, ASSIGNOR TO WESTINGHOUSE ELECTRIC AND MANUFACTURING COMPANY, A CORPORATION OF PENNSYLVANIA.

ELECTRICALLY-HEATED APPARATUS.

1,146,164.  Specification of Letters Patent.  Patented July 13, 1915.

Application filed October 23, 1912. Serial No. 727,297.

*To all whom it may concern:*

Be it known that I, THEODORE HOOCK, a subject of the Emperor of Germany, and a resident of Cologne, Bayenthal, Germany, have invented a new and useful Improvement in Electrically-Heated Apparatus, of which the following is a specification.

My invention relates to electrically heated apparatus, and it has special reference to removable cooking devices that are particularly adapted for use in connection with cooking stoves or ranges of the so-called "heat - storage" type which are provided with bodies of material for accumulating or storing heat that may be electrically supplied thereto at a low and substantially constant rate, whereby the heat that is thus accumulated may be available for cooking operations at any desired rate, when required.

The object of my invention is to provide a device of the above-indicated character which shall be simple, compact and durable in construction, and may be conveniently and effectively operated at a comparatively high efficiency, and shall furthermore embody ready means for clamping the device to the heat-storage range and for regulating the amount of heat supplied thereto.

According to my invention, I provide a detachable cooking device that is particularly adapted for broiling purposes and may be conveniently clamped to a heat-storage range, and be so constructed that the material to be broiled may be supported above a pan or the like and may be supplied with heat from above, whereby the juices which drip from the material are caught in the pan and prevented from damaging or collecting upon the working surface of the range. The device is well covered with heat-insulating material in order to prevent the loss of heat by radiation, and, by reason thereof, the device may be economically employed for the desired purpose. It should be understood that my device is not restricted in its use to heat-storage ranges, but may be employed in connection with any of the well known types of stoves or heating apparatus, although its application to heat-storage devices is particularly advantageous.

My invention may best be understood by reference to the accompanying drawing in which—

Figure 1 is a view, partially in section and partially in front elevation, of a heating apparatus embodying my invention. Fig. 2 is a view, partially in plan and partially in section, of a portion of the device shown in Fig. 1. Fig. 3 is an enlarged fragmentary view, partially in front elevation and partially in section, of certain parts of the device shown in Fig. 1. Fig. 4 is a view, partially in front elevation and partially in section, of a modified form of device constructed in accordance with my invention, and Figs. 5 and 6 are sectional views, respectively in front elevation and in side elevation, of a further modification of my invention.

Referring particularly to Figs. 1, 2 and 3, the apparatus here shown comprises a cooking range or stove 1 that is provided with a mass or body 2 of heat-storage material, such as cast iron or the like, having a plurality of upwardly projecting cylindrical members or hot plates 3. An electric heater 4 of any well known construction is disposed immediately beneath the heat-storage body 2, and is maintained in intimate engagement therewith, said heater being provided with a plurality of leads 5 which terminate in a terminal box 6 for purposes of connection to a suitable source of energy (not shown). In order to prevent loss of heat by radiation, and to insure that the heat supplied to the heat - storage body through the agency of the electric heater 4 is stored therein, said body is completely enveloped by walls of heat-insulating material 7, with the exception of the upper surfaces of the hot plates 3 which are exposed for cooking purposes.

One of the hot plates 3 is provided with a neck portion 8 of reduced cross section, whereby the upper portion thereof constitutes an outwardly projecting flange 9, for a purpose to be presently pointed out. Disposed at diametrically opposite points in the flange 9 are a plurality of recesses 10, and intermediate these recesses, the flange 9 is provided with parallel straight sides 11 for a purpose to be hereinafter described. The lower edges 12 of the oppositely disposed portions 13 of the flange 9 are slightly inclined with reference to a horizontal plane, as clearly shown in Fig. 3, and these portions of the flange constitute cam members, as will be hereinafter more fully set forth.

The removable cooking device 14 hereinbefore mentioned, comprises a cylindrical body member 15 which is preferably constructed of heat-storage or heat-conducting material, and is normally adapted to rest upon the upper surface of the hot plate 3. Surrounding the main portion of the member 15, is a rotatable annular member 16 having a suitable handle 17 and a plurality of oppositely disposed and downwardly projecting members or fingers 18, the latter being provided with inwardly turned ends 19 for purposes of coöperative engagement with the inclined surfaces 12 of the cam members 13 already mentioned. The sizes, proportions and location of the fingers 18 are so chosen that they may conveniently be passed over the parallel edges 11 of the flanged portion 9 of the hot plate 3.

Assuming the parts to occupy the positions shown in Figs. 1, 2 and 3, the member 15 may be secured to the hot plate 3 by moving the handle 17 in a clockwise direction, thereby causing the inwardly projecting ends 19 of the fingers 18 to coöperatively engage the inclined surfaces 12 of the cam members 13, whereby the parts referred to are securely clamped together and maintained under any desired pressure. Those skilled in the art will readily understand that the greater pressure between the member 15 and the hot plate 3, the less the heat loss due to the contact between them. Thus, by varying the pressure between these members, the amount of heat and consequently the temperature of the member 15, may be regulated as desired.

The member 15 is provided with a plurality of oppositely disposed downwardly projecting members 20 which are adapted to be inserted into the openings 10 in the upper flange 9 of the hot plate 3, whereby the member 15 is prevented from rotative movement and is maintained in its desired position. A substantially horizontal projecting overhanging arm or portion 21 forms an integral part of the member 15, and the under surface 22 thereof is exposed for cooking operations, while the remaining portions of the member 15 and its projecting portion 21 are well covered by suitable heat-insulating material 7 in order to prevent radiation of heat.

For broiling purposes, the meat 23 or other material to be cooked may be supported in a wire broiler 24 upon a pan 25 which is located beneath the overhanging or projecting portion 21 of the member 15. Thus, the heat supplied from the heat-storage body 2 is conducted through the member 15 and projecting arm 21, and is radiated from the exposed working surface 22 downwardly upon the material to be broiled. The removable cooking device is provided with a suitable handle 26 to facilitate handling.

Reference may now be had to Fig. 4 in which the removable cooking device 14ª embodies a body or block 15ª of suitable heat-storage or heat-conducting material, said block having a central recess 28 for the purpose of receiving the material to be broiled. The block 15ª is further provided with a clamping and heat-regulating device similar to that hereinbefore described in detail, and the exterior portions of the block are covered by walls of suitable heat-insulating material 7. A wall or layer 29 of a similar insulating material is disposed above the lower portion of the block 15ª, whereby the direct upward radiation of heat is prevented and the flow of heat from heat-storage body 2 to the working portion 21ª is effected through the side portions 30.

Reference may now be had to Figs. 5 and 6 in which a detachable member 15ᵇ of heat-conducting material is provided with an integrally associated upwardly projecting portion 31 and also with a clamping and regulating device similar to that already described. A movable member 32, also of suitable heat-conducting material, is suspended from a threaded shaft 33 that is supported in the walls of heat-insulating material 7 which envelop the aforesaid parts. One end of the rod 33 is provided with a handle 34 through the agency of which the movable member 32 may be adjusted in position. In order to efficiently conduct heat from the main portion of the heat-storage member 15ᵇ to the movable member 32, a connection 35 of flexible heat-conducting material is employed. Movably supported upon a plurality of rods 36, is a wire broiler 24 which is disposed between the vertical coöperating heat-conducting members 31 and 32, and serves to support the material to be cooked. A block 29ᵇ of heat-insulating material is located directly above the main portion of the member 15ᵇ and disposed thereon is a pan or receptacle 25 for the purpose of catching any of the juices which may drip from the material during the cooking operation. A door 37 of heat-insulating material is provided to completely inclose the parts hereinbefore mentioned in order that the cooking operation may be performed effectively and efficiently.

By reason of the relative movement that is permitted between the coöperating heat-conducting members 31 and 32, it is evident that the distance between the same and between either of the members and the material to be cooked may be varied as desired, whereby variations in the temperature of the heat supplied to the material may be effected. It is furthermore evident that both sides of the material may be broiled at the same time.

Although I have shown and described my invention as embodying specific structural details and a particular arrangement and location of parts, it is evident that many variations may be effected therein without departing from the spirit and scope of my invention, and I desire that only such limitations shall be imposed as are indicated in the appended claims.

I claim as my invention:

1. In a cooking device, the combination with a body of heat-storage material having a hot plate associated therewith, means for heating said body, and heat-insulating material surrounding said body, of a detachable member disposed upon said hot plate, and means for clamping said member in position.

2. In a cooking device, the combination with a body of heat-storage material having a hot plate associated therewith, means for heating said body, and heat-insulating material enveloping the same, of a removable member of heat-storage material coöperating with said hot plate, heat-insulating material enveloping said member, and means for securing intimate contact between said member and said hot plate.

3. In a cooking device, the combination with a body of heat-storage material having a hot plate associated therewith, means for heating said body, and walls of heat-insulating material surrounding the same, of a removable member of heat-conducting material disposed upon said hot plate and having an overhanging projecting portion, and heat-insulating material covering said member.

4. In a cooking device, the combination with a heat-storage body having a hot plate associated therewith, means for supplying heat to said body, and walls of heat-insulating material enveloping said body, of a removable block of heat-storage material disposed upon said hot plate and having a recess therein, and heat-insulating material surrounding said block.

5. In a cooking device, the combination with a heat-storage body, a hot plate associated therewith, means for heating said body, and means for preventing the radiation of heat therefrom, of a removable member of heat-conducting material disposed upon said hot plate and embodying a downwardly exposed working surface, and heat-insulating material covering the remaining portions of said member.

6. In a cooking device, the combination with a heat-storage body having a hot plate associated therewith, means for heating said body, and heat-insulating material surrounding said parts, of a recessed block of heat-storage material resting upon said hot plate, heat-insulating material enveloping said block and also disposed above the lower wall of said recessed block to prevent free radiation of heat.

7. In a cooking device, the combination with a body of heat-storage material having a projecting arm, of a hot plate associated therewith, means for heating said body, and heat-insulating material surrounding said body, of a detachable heating member having a portion disposed upon said hot plate, a movable annular member inclosing said portion and having extending fingers, and wedging means associated with said hot plate for engaging said fingers to clamp said heating member in position upon predetermined movement of said annular member.

8. In a cooking device, the combination with a body of heat-storage material having a hot plate associated therewith, means for heating said body, and heat-insulating material enveloping the same, of a detachable member of heat conducting material disposed upon said hot plate and having a downwardly exposed working surface for cooking purposes, heat-insulating material enveloping the remaining portions of said member, and mechanical means for securing said member to said hot plate.

9. In a cooking device, the combination with a body of heat-storage material having a hot plate associated therewith, means for supplying heat to said body, and walls of heat-insulating material surrounding the same, of means attached to said hot plate for conducting the heat therefrom to a particular point, and heat-insulating material enveloping said conducting means to prevent the radiation of heat therefrom.

10. In a cooking device, the combination with a heat-storage body, means for heating the same, and heat-insulating material surrounding said body, of a heat-insulated heat-storage member disposed on said body, and adjustable mechanical means coöperating with said member and said body for clamping said parts together.

11. In an electrically heated cooking device, the combination with a body of heat-storage material having a hot plate associated therewith, and heat-insulating material surrounding the same, of a heat-insulated member of heat-storage material disposed upon said hot plate, and mechanical means for securing said member to said hot plate and for varying the pressure between said member and said hot plate, whereby variations in the heat supplied to said member are effected.

12. In an electrically heated device, the combination with a body of heat-storage material, a plurality of cam members associated therewith, and heat-insulating material enveloping the main portion of said body, of a heat-insulated cooking device disposed upon a portion of said body, and a rotatable member associated with said cooking device and embodying fingers to coöperate with said cam members for clamping said cooking device to said body.

13. In a cooking device, the combination with a heat-storage body having a hot plate associated therewith, means for supplying heat to said body, and walls of heat-insulating material enveloping said body, of a removable block of heat-storage material disposed upon said hot plate and having a heating opening therein, heat-insulating material surrounding said block, and means for clamping said block in operative position.

14. In a cooking device comprising a member of heat-conducting material having a downwardly exposed working surface for cooking purposes, and walls of heat-insulating material enveloping the remaining portions of said member.

15. A cooking device comprising a block of heat-storage material having a recess therein to receive the food to be cooked, side and top walls of heat-insulating material surrounding said block to prevent the radiation of heat, and means for preventing the food to be cooked from receiving direct heat from a portion of said block.

16. In a cooking device, the combination with a body of heat-storage material having a hot-plate associated therewith, means for heating said body, and heat-insulating material surrounding said body, of a detachable member disposed upon said hot plate, and means for varying the thermal contact therebetween to regulate the heat supplied to said detachable member.

17. In a cooking device, the combination with a body of heat-storage material having a hot plate associated therewith, means for heating said body, and heat-insulating material enveloping the same, of a detachable member of heat-storage material disposed upon said hot plate and having a downwardly exposed heating surface, heat-insulating material enveloping the remaining portions of said member, and means for varying the thermal contact between said member and said hot plate to regulate the heat supplied to said member.

18. In a cooking device, the combination with a body of heat-storage material having an exposed portion and a heat-insulated portion adjacent thereto, a hot plate associated with said body, means for heating said body, and heat-insulating material surrounding the same, of a detachable member of heat-storage material disposed upon said hot plate and provided with an overhanging portion having a downwardly exposed heating surface located over the heat-insulated portion of said body, and walls of heat-insulating material enveloping the remaining portions of said overhanging portion.

In testimony whereof, I have hereunto subscribed my name this 5th day of August 1912.

THEODORE HOOCK.

Witnesses:
 Louis Vandory,
 Bessie F. Dunlap.